(12) United States Patent
Ehrlich et al.

(10) Patent No.: US 12,562,965 B2
(45) Date of Patent: Feb. 24, 2026

(54) TIME SERIES TRANSACTION FAILURE CAUSE DETECTION AND GENERATIVE ALERTING FOR WIRELESS NETWORK TRANSACTIONS

(71) Applicant: AT&T Intellectual Property I, L.P., Atlanta, GA (US)

(72) Inventors: Willa Ehrlich, Highland Park, NJ (US); Li-Chuan Sun, Holmdel, NJ (US); Lingyuan Cao, Holmdel, NJ (US); Samyukta Kulkarni, Edison, NJ (US); Elissa Backas, Sayreville, NJ (US); Mark Stockert, San Antonio, TX (US); Dhruva Kumar Singh, Renton, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 28 days.

(21) Appl. No.: 18/791,218

(22) Filed: Jul. 31, 2024

(65) Prior Publication Data

US 2026/0039561 A1 Feb. 5, 2026

(51) Int. Cl.
| | |
|---|---|
| *H04L 41/14* | (2022.01) |
| *H04L 43/0823* | (2022.01) |
| *H04L 41/22* | (2022.01) |

(52) U.S. Cl.
CPC ........ *H04L 41/145* (2013.01); *H04L 43/0823* (2013.01); *H04L 41/22* (2013.01)

(58) Field of Classification Search
CPC .... H04L 41/145; H04L 43/0823; H04L 41/22
See application file for complete search history.

(56) References Cited

U.S. PATENT DOCUMENTS

| | | | | |
|---|---|---|---|---|
| 12,407,581 | B1 * | 9/2025 | Vasseur | H04L 41/046 |
| 2019/0155672 | A1 * | 5/2019 | Wang | G06F 11/079 |
| 2024/0345573 | A1 * | 10/2024 | Goyal | G05B 23/0281 |
| 2025/0203443 | A1 * | 6/2025 | Kher | H04L 5/0048 |
| 2025/0265261 | A1 * | 8/2025 | Stirling | G06F 40/58 |
| 2025/0307056 | A1 * | 10/2025 | Christensen | G06N 5/045 |

FOREIGN PATENT DOCUMENTS

| | | | | | |
|---|---|---|---|---|---|
| EP | | 3938909 B1 * | 5/2023 | | H04L 41/082 |
| WO | WO-2024079385 A1 * | | 4/2024 | | H04L 63/1425 |

* cited by examiner

*Primary Examiner* — Philip C Lee

(57) ABSTRACT

A processing system may obtain time series associated with a plurality of network functions of a communication network, each time series including a sequence of values over a plurality of time intervals, each value indicating a percentage of events generated by a respective network function indicating a procedure failure within a respective time interval out of a total number of events generated by the respective network function within the respective time interval, identify, via a time series anomaly detection algorithm implemented by the processing system, an anomaly detection result comprising at least one time interval in which at least one time series exhibits at least one anomaly, apply a query to a generative model requesting an interpretation of the anomaly detection result, where an output comprising the interpretation is generated via the generative model in response to the query, and present the output to at least one endpoint device.

20 Claims, 7 Drawing Sheets

600

START — 605

OBTAIN A PLURALITY OF TIME SERIES ASSOCIATED WITH A PLURALITY OF NETWORK FUNCTIONS OF A COMMUNICATION NETWORK, EACH OF THE PLURALITY OF TIME SERIES COMPRISING A SEQUENCE OF VALUES OVER A PLURALITY OF TIME INTERVALS, AND WHERE EACH VALUE OF THE SEQUENCE OF VALUES INDICATES A PERCENTAGE OF EVENTS GENERATED BY A RESPECTIVE NETWORK FUNCTION INDICATING A PROCEDURE FAILURE WITHIN A RESPECTIVE TIME INTERVAL OF THE PLURALITY OF TIME INTERVALS OUT OF A TOTAL NUMBER OF EVENTS GENERATED BY THE RESPECTIVE NETWORK FUNCTION WITHIN THE RESPECTIVE TIME INTERVAL — 610

IDENTIFY, VIA A TIME SERIES ANOMALY DETECTION ALGORITHM IMPLEMENTED BY THE PROCESSING SYSTEM, AN ANOMALY DETECTION RESULT COMPRISING AT LEAST ONE TIME INTERVAL OF THE PLURALITY OF TIME INTERVALS IN WHICH AT LEAST ONE TIME SERIES OF THE PLURALITY OF TIME SERIES EXHIBITS AT LEAST ONE ANOMALY — 620

APPLY A QUERY TO A GENERATIVE MODEL REQUESTING AN INTERPRETATION OF THE ANOMALY DETECTION RESULT, WHERE AN OUTPUT COMPRISING THE INTERPRETATION IS GENERATED VIA THE GENERATIVE MODEL IN RESPONSE TO THE QUERY — 630

PRESENT, TO AT LEAST ONE ENDPOINT DEVICE, THE OUTPUT COMPRISING THE INTERPRETATION OF THE ANOMALY DETECTION RESULT — 640

RECONFIGURE AT LEAST ONE ASPECT OF THE COMMUNICATION NETWORK IN RESPONSE TO THE OUTPUT OF THE GENERATIVE MODEL — 650

END — 695

200

Anomalous NF Detected
AMF_PDU SESSION ESTABLISHMENT
Prop. Failed Events: 0.982

| Attribute | Standardized Entropy | Dominant Setting | Prop. Failed Events Exhibiting Dominant Setting |
|---|---|---|---|
| NCI | 0.039 | 1559.1452724 | 0.992 |
| IMSI | 0.039 | 3104.10369882648 | 0.992 |
| AMFI | 0.039 | 253-521-45 | 0.992 |
| TAI | 0.039 | 310-410-2130025 | 0.992 |
| EVENT_DESC | 0.046 | PAYLOAD_WAS_NOT_FORWARDED&NO_NF_SERVICE_AVAILABLE | 0.992 |

QUERY

We have applied ML anomaly detection to identify 5G Network Functions that failed with respect to PDU Session processing during 15 minute time periods. A 5G Network Function is deemed "failed" if the number of failed events representing failures in PDU SESSION processing during that time period is statistically greater than expected. Each data record (which is comma separated) in our data set contains the bin number (consecutive 15 minute time period), the timestamp for the start of the 15-minute time period, the name of the failing Network Function, and an attribute value pair. This attribute value pair indicates an attribute and the attribute value that is highly associated with the Network Function's failed events within the specified time interval. The data that we have included in this query represent data records for multiple 5G Network Functions that failed simultaneously during the same 15-minute time period. Please note that the RAN Component, CTR, is downstream from the AMF Network Function, which, in turn, is downstream from the SMF Network Function. Based on your best interpretation, can you please tell me which failing Network Function and NFProc Correlated Attribute Value is the root cause of the other failing Network Functions?

Bin Number,Timestamp,NFProc Name,NFProc Correlated Attribute Name,NFProc Correlated Attribute Value,NFProc Correlated Attribute Value Share of Failed Events
165,8/30/2023 21:00,AMF_PDU_SESSION_ESTABLISHMENT,GNB,WAWN001601,0.888889
165,8/30/2023 21:00,AMF_PDU_SESSION_ESTABLISHMENT,IMSI,11A32B28356AA,0.911111
165,8/30/2023 21:00,AMF_PDU_SESSION_ESTABLISHMENT,MARKET,WASHINGTON,0.933333
165,8/30/2023 21:00,AMF_PDU_SESSION_ESTABLISHMENT,REGION,WEST,1
165,8/30/2023 21:00,AMF_PDU_SESSION_ESTABLISHMENT,TAI,310-410-3160089,0.888889
165,8/30/2023 21:00,CTR_PDU_SESSION_RESOURCE_SETUP,EVENT_DESC,PDU_SESSION_RESOURCE_SETUP_RESULT_FAILURE,1
165,8/30/2023 21:00,SMF_NETWORK_INITIATED_PDU_SESSION_RELEASE,EVENT_DESC,Timed out waiting for the Update Sm Context Message,0.941176

RESPONSE

Based on the data provided, it appears that the root cause of the other failing Network Functions is the SMF_NETWORK_INITIATED_PDU_SESSION_RELEASE, with the NFProc Correlated Attribute Value of "Timed out waiting for the Update Sm Context Message" and NFProc Correlated Attribute Value Share of Failed Events at .941176. This is because the SMF (Session Management Function) is upstream of the AMF (Access and Mobility Management Function) and the CTR (Cell Traffic Repository). Since the SMF_NETWORK_INITIATED_PDU_SESSION_RELEASE has a high share of failed events (.941176) and the specific correlated attribute value ("Timed out waiting for the Update Sm Context Message") suggests a timeout issue, it is likely that this is causing issues in the downstream Network Functions (AMF_PDU_SESSION_ESTABLISHMENT and CTR_PDU_SESSION_RESOURCE_SETUP).

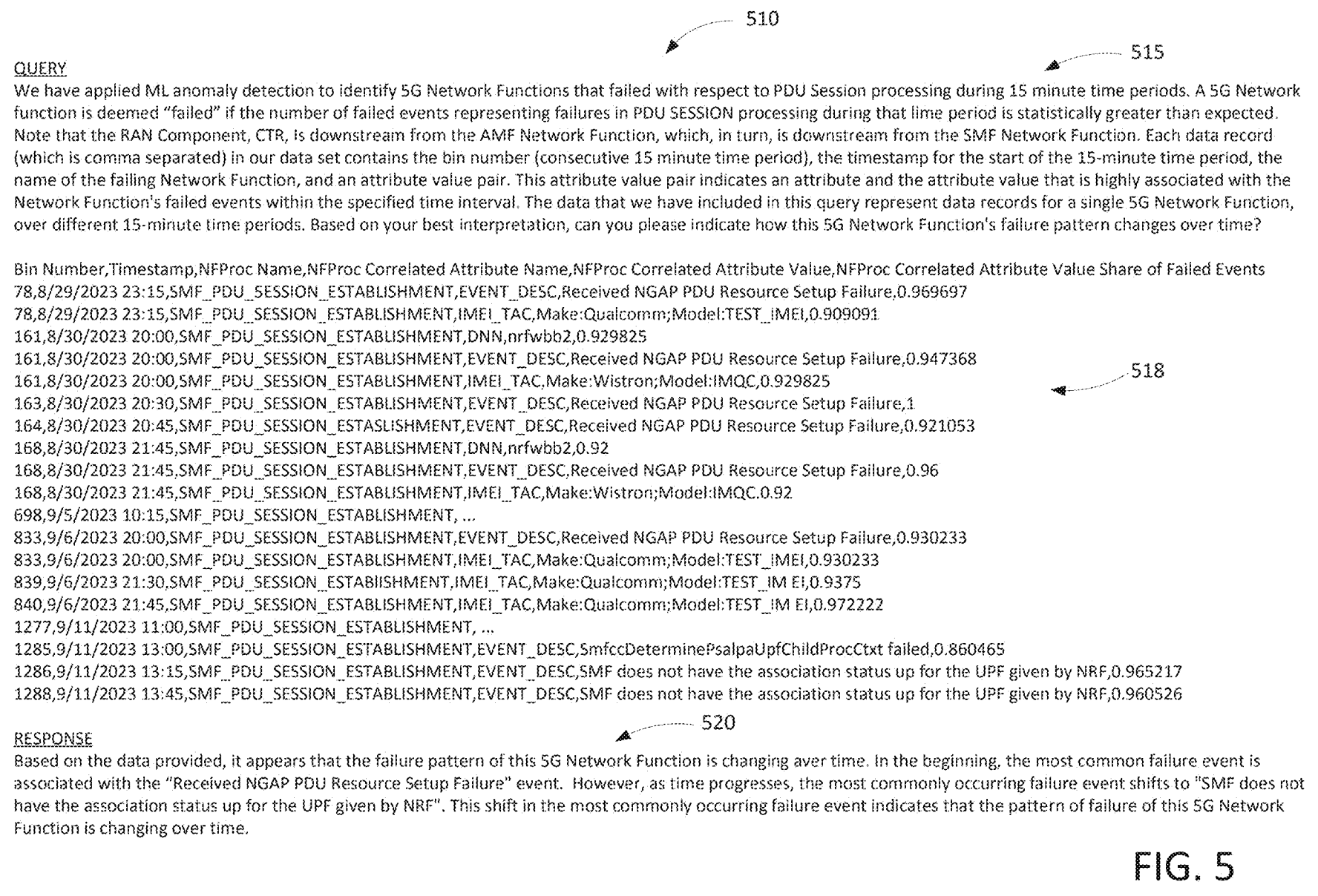

QUERY

We have applied ML anomaly detection to identify 5G Network Functions that failed with respect to PDU Session processing during 15 minute time periods. A 5G Network function is deemed "failed" if the number of failed events representing failures in PDU SESSION processing during that time period is statistically greater than expected. Note that the RAN Component, CTR, is downstream from the AMF Network Function, which, in turn, is downstream from the SMF Network Function. Each data record (which is comma separated) in our data set contains the bin number (consecutive 15 minute time period), the timestamp for the start of the 15-minute time period, the name of the failing Network Function, and an attribute value pair. This attribute value pair indicates an attribute and the attribute value that is highly associated with the Network Function's failed events within the specified time interval. The data that we have included in this query represent data records for a single 5G Network Function, over different 15-minute time periods. Based on your best interpretation, can you please indicate how this 5G Network Function's failure pattern changes over time?

Bin Number,Timestamp,NFProc Name,NFProc Correlated Attribute Name,NFProc Correlated Attribute Value,NFProc Correlated Attribute Value Share of Failed Events 78,8/29/2023 23:15,SMF_PDU_SESSION_ESTABLISHMENT,EVENT_DESC,Received NGAP PDU Resource Setup Failure,0.969697

78,8/29/2023 23:15,SMF_PDU_SESSION_ESTABLISHMENT,IMEI_TAC,Make:Qualcomm;Model:TEST_IMEI,0.909091

161,8/30/2023 20:00,SMF_PDU_SESSION_ESTABLISHMENT,DNN,nrfwbb2,0.929825

161,8/30/2023 20:00,SMF_PDU_SESSION_ESTABLISHMENT,EVENT_DESC,Received NGAP PDU Resource Setup Failure,0.947368

161,8/30/2023 20:00,SMF_PDU_SESSION_ESTABLISHMENT,IMEI_TAC,Make:Wistron;Model:IMQC,0.929825

163,8/30/2023 20:30,SMF_PDU_SESSION_ESTABLISHMENT,EVENT_DESC,Received NGAP PDU Resource Setup Failure,1

164,8/30/2023 20:45,SMF_PDU_SESSION_ESTASLISHMENT,EVENT_DESC,Received NGAP PDU Resource Setup Failure,0.921053

168,8/30/2023 21:45,SMF_PDU_SESSION_ESTABLISHMENT,DNN,nrfwbb2,0.92

168,8/30/2023 21:45,SMF_PDU_SESSION_ESTABLISHMENT,EVENT_DESC,Received NGAP PDU Resource Setup Failure,0.96

168,8/30/2023 21:45,SMF_PDU_SESSION_ESTABLISHMENT,IMEI_TAC,Make:Wistron;Model:IMQC,0.92

698,9/5/2023 10:15,SMF_PDU_SESSION_ESTABLISHMENT, ...

833,9/6/2023 20:00,SMF_PDU_SESSION_ESTABLISHMENT,EVENT_DESC,Received NGAP PDU Resource Setup Failure,0.930233

833,9/6/2023 20:00,SMF_PDU_SESSION_ESTABLISHMENT,IMEI_TAC,Make:Qualcomm;Model:TEST_IMEI,0.930233

839,9/6/2023 21:30,SMF_PDU_SESSION_ESTABLISHMENT,IMEI_TAC,Make:Qualcomm;Model:TEST_IM EI,0.9375

840,9/6/2023 21:45,SMF_PDU_SESSION_ESTABLISHMENT,IMEI_TAC,Make:Qualcomm;Model:TEST_IM EI,0.972222

1277,9/11/2023 11:00,SMF_PDU_SESSION_ESTABLISHMENT, ...

1285,9/11/2023 13:00,SMF_PDU_SESSION_ESTABLISHMENT,EVENT_DESC,SmfccDeterminePsalpaUpfChildProcCtxt failed,0.860465

1286,9/11/2023 13:15,SMF_PDU_SESSION_ESTABLISHMENT,EVENT_DESC,SMF does not have the association status up for the UPF given by NRF,0.965217

1288,9/11/2023 13:45,SMF_PDU_SESSION_ESTABLISHMENT,EVENT_DESC,SMF does not have the association status up for the UPF given by NRF,0.960526

518

520

RESPONSE

Based on the data provided, it appears that the failure pattern of this 5G Network Function is changing over time. In the beginning, the most common failure event is associated with the "Received NGAP PDU Resource Setup Failure" event. However, as time progresses, the most commonly occurring failure event shifts to "SMF does not have the association status up for the UPF given by NRF". This shift in the most commonly occurring failure event indicates that the pattern of failure of this 5G Network Function is changing over time.

FIG. 5

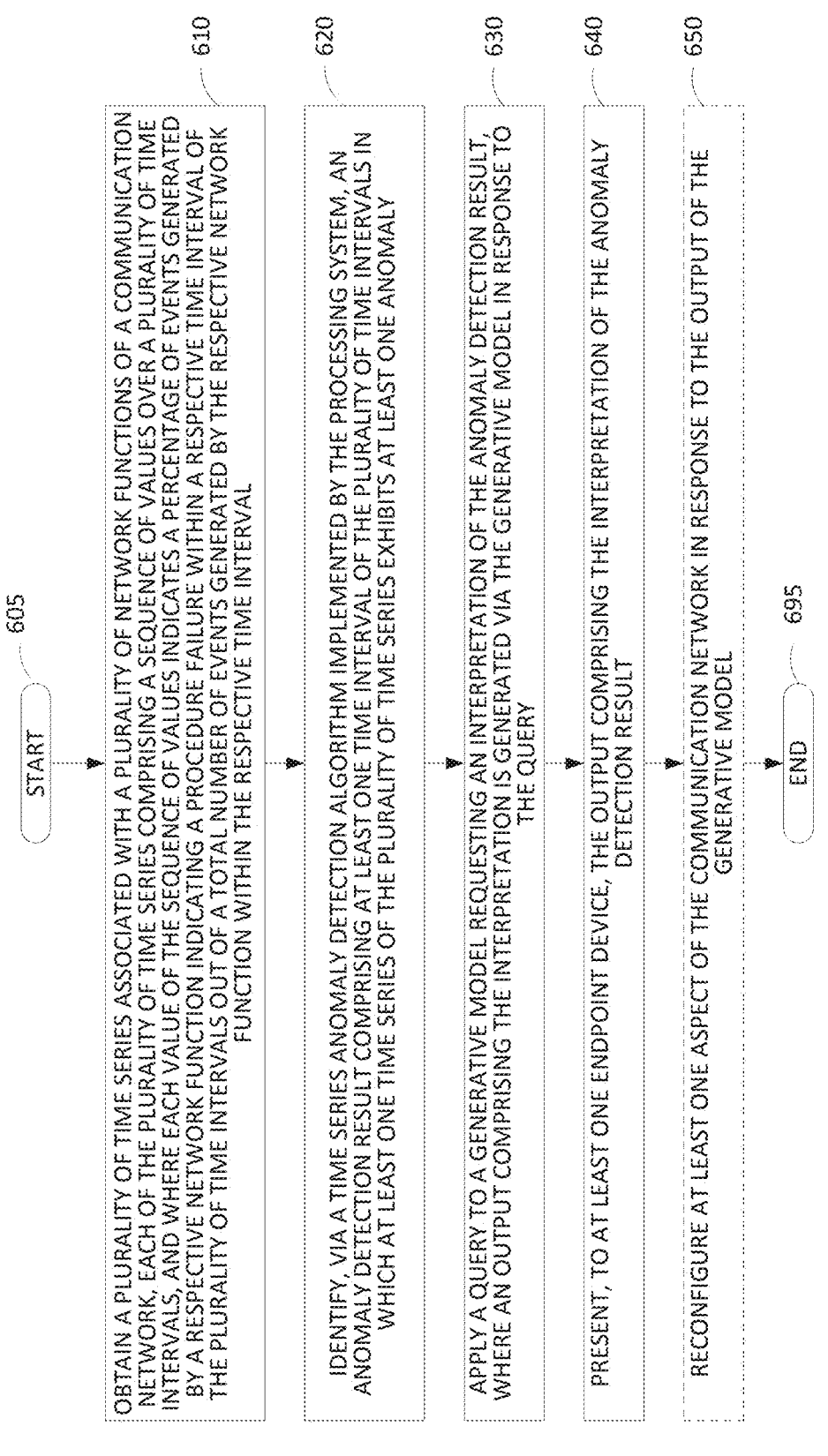

600

START — 605

OBTAIN A PLURALITY OF TIME SERIES ASSOCIATED WITH A PLURALITY OF NETWORK FUNCTIONS OF A COMMUNICATION NETWORK, EACH OF THE PLURALITY OF TIME SERIES COMPRISING A SEQUENCE OF VALUES OVER A PLURALITY OF TIME INTERVALS, AND WHERE EACH VALUE OF THE SEQUENCE OF VALUES INDICATES A PERCENTAGE OF EVENTS GENERATED BY A RESPECTIVE NETWORK FUNCTION INDICATING A PROCEDURE FAILURE WITHIN A RESPECTIVE TIME INTERVAL OF THE PLURALITY OF TIME INTERVALS OUT OF A TOTAL NUMBER OF EVENTS GENERATED BY THE RESPECTIVE NETWORK FUNCTION WITHIN THE RESPECTIVE TIME INTERVAL — 610

IDENTIFY, VIA A TIME SERIES ANOMALY DETECTION ALGORITHM IMPLEMENTED BY THE PROCESSING SYSTEM, AN ANOMALY DETECTION RESULT COMPRISING AT LEAST ONE TIME INTERVAL OF THE PLURALITY OF TIME INTERVALS IN WHICH AT LEAST ONE TIME SERIES OF THE PLURALITY OF TIME SERIES EXHIBITS AT LEAST ONE ANOMALY — 620

APPLY A QUERY TO A GENERATIVE MODEL REQUESTING AN INTERPRETATION OF THE ANOMALY DETECTION RESULT, WHERE AN OUTPUT COMPRISING THE INTERPRETATION IS GENERATED VIA THE GENERATIVE MODEL IN RESPONSE TO THE QUERY — 630

PRESENT, TO AT LEAST ONE ENDPOINT DEVICE, THE OUTPUT COMPRISING THE INTERPRETATION OF THE ANOMALY DETECTION RESULT — 640

RECONFIGURE AT LEAST ONE ASPECT OF THE COMMUNICATION NETWORK IN RESPONSE TO THE OUTPUT OF THE GENERATIVE MODEL — 650

END — 695

TIME SERIES TRANSACTION FAILURE CAUSE DETECTION AND GENERATIVE ALERTING FOR WIRELESS NETWORK TRANSACTIONS

The present disclosure relates generally to wireless communication networks, and more particularly to methods, non-transitory computer-readable media, and apparatuses for obtaining an interpretation of an anomaly detection result of a time series anomaly detection algorithm for time series associated with network function procedure failures via a generative model.

BACKGROUND

A cloud radio access network (RAN) is part of the $3^{rd}$ Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network. 5G is intended to deliver superior high speed and performance. However, during initial deployments, 5G may potentially suffer from limited coverage areas, higher costs of deployment, slow rollout, and more costly initial subscription plans.

SUMMARY

In one example, the present disclosure discloses a method, computer-readable medium, and apparatus for obtaining an interpretation of an anomaly detection result of a time series anomaly detection algorithm for time series associated with network function procedure failures via a generative model. For example, a processing system including at least one processor may obtain a plurality of time series associated with a plurality of network functions of a communication network. Each of the plurality of time series may include a sequence of values over a plurality of time intervals, where each value of the sequence of values indicates a percentage of events generated by a respective network function of the plurality of network functions indicating a procedure failure within a respective time interval of the plurality of time intervals out of a total number of events generated by the respective network function within the respective time interval. The processing system may next identify, via a time series anomaly detection algorithm implemented by the processing system, an anomaly detection result comprising at least one time interval of the plurality of time intervals in which at least one time series of the plurality of time series exhibits at least one anomaly. The processing system may then apply a query to a generative model requesting an interpretation of the anomaly detection result, where an output comprising the interpretation is generated via the generative model in response to the query. In addition, the processing system may present, to at least one endpoint device, the output comprising the interpretation of the anomaly detection result.

BRIEF DESCRIPTION OF THE DRAWINGS

The teachings of the present disclosure can be readily understood by considering the following detailed description in conjunction with the accompanying drawings, in which:

FIG. 2 illustrates an example table comprising dominant attribute settings for a network function detected to be anomalous during a given time interval;

FIG. 4 illustrates an example query and response of a generative model, e.g., for a root cause analysis, in accordance with the present disclosure;

FIG. 5 illustrates an additional example query and response of a generative model, e.g., for an interpretation of a change in network function failure pattern over time, in accordance with the present disclosure;

FIG. 6 illustrates a flowchart of an example method for obtaining an interpretation of an anomaly detection result of a time series anomaly detection algorithm for time series associated with network function procedure failures via a generative model.

To facilitate understanding, similar reference numerals have been used, where possible, to designate elements that are common to the figures.

DETAILED DESCRIPTION

Figure 1:
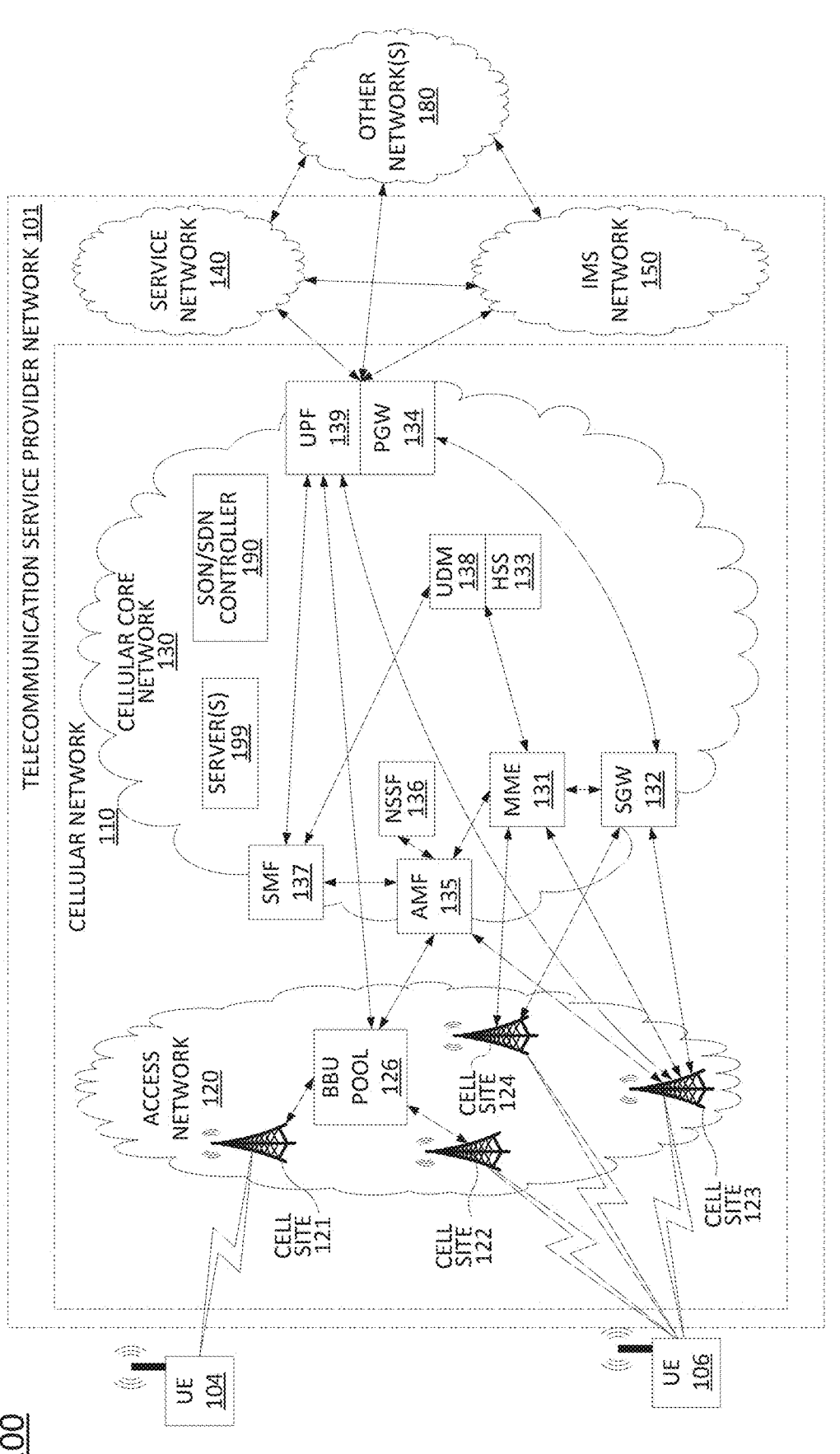
FIG. 1 illustrates a block diagram of an example system, in accordance with the present disclosure.

The present disclosure broadly discloses methods, computer-readable media, and apparatuses for obtaining an interpretation of an anomaly detection result of a time series anomaly detection algorithm for time series associated with network function procedure failures via a generative model. In particular, modern mobility networks (e.g., 5G/5G+) may be characterized by virtualized, containerized, and/or physical network functions (NFs) that interact jointly in a myriad of end-to-end transactions. During execution, NFs may emit time-stamped events (which may also be referred to herein as event records or notifications) that under certain settings may indicate anomalous processing. In particular, event records may indicate failures in processing of certain procedures and may contain additional useful information. In one example, the present disclosure may organize failure event records (e.g., event records indicating failures) generated by different NFs into respective time series, which may then be analyzed via unsupervised multivariate time series anomaly detection (MTSAD) machine learning (ML) techniques to identify time intervals that are anomalous. In particular, examples of the present disclosure may correlate these time series to detect concurrent anomalous NFs within the same time interval. In addition, examples of the present disclosure may provide generative interpretations of time series anomaly detection results via a unique, generative model-based interpretation generation process.

To illustrate, during a first phase, the present disclosure may apply a time series anomaly detection algorithm to one or more time series to detect time intervals containing multiple NFs that are jointly emitting a high rate of failure events, e.g., after adjusting for correlations among multiple NF time series. For each anomalous NF detected during an extended time period, an event failure pattern may be identified based on dominant attribute settings/values associated with failure events occurring in the time interval(s) within the larger, extended time period. In a second phase, generative artificial intelligence (AI) and/or machine learning (ML) (broadly a "generative model") may be applied to generate an output comprising an interpretation of an MTSAD-generated anomaly detection result. In one example, the generative interpretation may be created on-demand in response to a user-initiated query or via an automated, real-time/near real-time automated flow, e.g., on an ongoing basis without user input.

To further illustrate, the present disclosure may first ingest failure event data generated by NFs over a certain time window, e.g., to generate a time series indicating a volume or percentage of failure events. For each NF, the present disclosure may then fit a time series model that accounts for both seasonality and trend to the failure event time series. In addition, for each NF, the present disclosure may next identify at least one time interval with a residual score with significant deviation. In one example, the present disclosure may further apply a MTASD technique to identify that the at least one time interval contains multiple, concurrently anomalous NFs. The at least one time interval, and at least one NF having a failure event time series indicating an anomaly in the at least one time interval (or multiple NFs with concurrent failure event data/anomalies in the at least one time period), together with additional failure event data may constitute the unsupervised time series anomaly detection results.

In a second phase, the present disclosure may then apply literature-based discovery (LBD) and knowledge-enhanced context capabilities of generative models to interpret and supplement the time series anomaly detection results. In one example, the present disclosure may provide a tailored prompt, or prompts for obtaining interpretations of the time series anomaly detection results. For instance, a first type of tailored prompt may comprise a prompt requesting to identify a root cause of concurrent NFs emitting high event failure rates in a same time interval. Alternatively, or in addition, a second type of tailored prompt may comprise a prompt to identify a change in an NF failure event pattern over time, e.g., for a single NF. Still other types of prompts may request interpretations of other types of NF event time series anomalies, such as NF response latency exceeding a threshold, dropped packet/octet rate exceeding a threshold, an NF throughput falling below a threshold, and so forth. In one example, network architecture information and time series anomaly detection results data may be embedded within the prompt or added to a query comprising the prompt for input to a generative model, e.g., a large language model (LLM). For instance, examples of the present disclosure may supplement the prompts and capabilities of the generative model using retrieval augmented generation (RAG). As such, examples of the present disclosure reduce delay in network troubleshooting, root cause identification, and resolution. These and other aspects of the present disclosure are discussed in greater detail below in connection with the examples of FIGS. 1-7.

To better understand the present disclosure, FIG. 1 illustrates an example network, or system 100 in which examples of the present disclosure may operate. In one example, the system 100 includes a communication service provider network 101. The communication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In accordance with the present disclosure, any one or more of cell sites 121-123 may be deployed with antenna and radio infrastructures, including multiple input multiple output (MIMO) and millimeter wave antennas.

In one example, access network 120 may include both 4G/LTE and 5G radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, a user plane function (UPF) 139, and so forth.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device (such as UE 104 or UE 106) to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, e.g., network functions (NFs), such as AMF(s), SMF(s), UPF(s), and so forth that may be arranged into different network slices which may logically be considered to be separate cellular networks. A specific set of NFs arranged into a network slice may also be referred to as a network slice instance (NSI). In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, a fifth network slice may be used for first responder or other governmental services, and so forth.

In one example, SMF 137 may perform endpoint device IP address management, UPF selection, UPF configuration for endpoint device traffic routing to an external packet data network (PDN), charging data collection, quality of service (QOS) enforcement, and so forth. In one example, UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, UPF 139, and/or server(s) 199 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 121 and 122, respectively, may allocate and deactivate baseband units in BBU pool 126, and may perform other operations for activating antennas based upon a location and a movement of an endpoint device or a group of endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, UPF 139, and/or server(s) 199 and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of UE 104 and UE 106 may also include a gyroscope and compass to determine orientation(s), a global positioning system (GPS) receiver for determining a location, and so forth. As illustrated in FIG. 1, UE 104 may access wireless services via the cell site 121, while UE 106 may access wireless services via any of cell sites 122-124 located in the access network 120.

As noted above, network functions (NFs) may interact in various end-to-end transactions. For instance, UE 104, a RAN/gNB (e.g., cell site 121 and BBU pool 126), AMF 135, SMF 137, and UPF 139 may engage in a sequence of messages/interactions for a protocol data unit (PDU) session establishment. To further illustrate, UE 104 may transmit a PDU session establishment request to AMF 135. In response, AMF 135 may transmit a create session management context request to SMF 137. The SMF 137 may then retrieve subscription data relating to UE 104 (and/or relating to the user thereof) from UDM 138, may select a PCF, and may transmit quality of service (QOS) flow identifier (QFI) to the UPF 139. UPF 139 may respond to SMF 137 with a tunnel endpoint identifier (TEID) for UPF 139. SMF 137 may then transmit a create session management context response message to AMF 135 along with N1/N2 messages. AMF 135 may forward N2 messages to the gNB (e.g., cell site 121 and BBU pool 126) and may forward N1 messages to the UE 103, thus establishing a DRB. The gNB may transmit a TEID to AMF 135, which may pass the TEID to SMF 137, which may transmit session modification information containing the gNB TEID to UPF 139 which may thus recreate the PDU session between UE 104 and UPF 139. In the event of a failed transaction/procedure, such as a PDU session establishment failure, NFs participating in the transaction may emit time-stamped event notifications signaling the failed outcome (e.g., time-stamped failure events). For instance, a procedure failure may be indicated by a lack of response by one NF from another NF, a response that indicates that an NF could not complete a requested task, or the like.

From such a sequence of event notifications, the present disclosure may aggregate and store a time series for each NF comprising a sequence of values over a plurality of time intervals, wherein each value of the sequence of values indicates a percentage of events generated by the NF indicating a procedure failure within a respective time interval out of a total number of events generated by the respective NF within the time interval. For instance, the time-stamped event notifications may be emitted by various NFs and may be transmitted to one or more subscribing entities, such as server(s) 199, SON/SDN controller 190, others of the NFs, one or more devices or systems of service network 140, and so forth.

Figure 7:
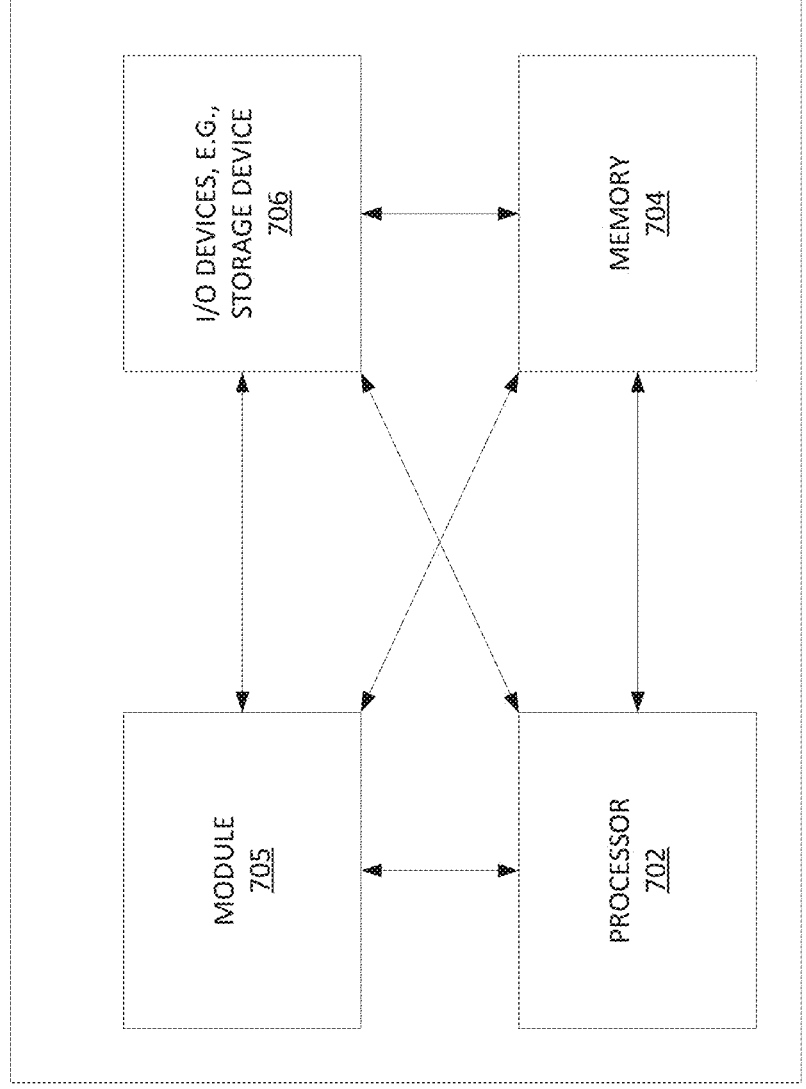
FIG. 7 illustrates an example of a computing device, or computing system, specifically programmed to perform the steps, functions, blocks, and/or operations described herein.

In one example, aspects of the present disclosure for obtaining an interpretation of an anomaly detection result of a time series anomaly detection algorithm for time series associated with network function procedure failures via a generative model, e.g., as described in greater detail below in connection with the example method 600 of FIG. 6, may be performed by one or more of server(s) 199, e.g., one or more application servers. In this regard, server(s) 199 may comprise all or a portion of a computing device or system, such as computing system 700, and/or processing system 702 as described in connection with FIG. 7 below, and may be configured to perform various operations in connection with examples of the present disclosure for obtaining an interpretation of an anomaly detection result of a time series anomaly detection algorithm for time series associated with network function procedure failures via a generative model. It should also be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure.

To further illustrate, server(s) 199 may obtain a plurality of time series associated with various NFs. In one example, server(s) 199 may obtain time stamped event notifications and may formulate the time series as described above. Alternatively, or in addition, the time series may be aggregated/generated by another entity of the telecommunication service provider network 101, such as a database system (not shown), and accessed by the server(s) 199. In any case, server(s) 199 may next identify, via a time series anomaly detection algorithm, an anomaly detection result comprising at least one time interval in which at least one time series for at least one of the NFs exhibits at least one anomaly, e.g., as defined according to the time series anomaly detection algorithm. For instance, server(s) 199 may implement the time series anomaly detection algorithm, which in one example may comprise a multivariate time series anomaly detection algorithm as described in greater detail below.

Server(s) 199 may then apply a query to a generative model requesting an interpretation of the anomaly detection result. In accordance with the present disclosure, the query may include a prompt, which may comprise a request for an identification of a root cause network function and/or an identification of a root cause procedure from among various procedure failures indicated in the event notifications. In one example, the prompt may also include a description of an architecture of the communication network and/or a description of a structure of input data included in the query. For instance, the query may also include a plurality of records for a plurality of attributes associated with the at least one anomaly and/or associated with procedure failures within the time interval. For instance, each record may include: a time stamp, an identification of an NF associated with a time series exhibiting an anomaly in the time period, an identification of a procedure initiated by the NF, an identification of an attribute type, and an attribute value. In one example, server(s) 199 may select one or more vectors from a vector database that are relevant to the prompt and may apply the vectors as supplemental prompt content to the generative model. For instance, the one or more vectors may comprise vectorized text from one or more data sources. In this regard, in one example, server(s) 199 may also include a document repository and/or vector database, e.g., that may be used for retrieval augmented generation (RAG), as described herein. The output of the generative model may comprise the interpretation, which may be generated in response to the specific query. In addition, server(s) 199 may present to at least one endpoint device (e.g., device(s) of one or more network personnel) the output comprising the interpretation of the anomaly detection result.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), a network data analytics functions (NWDAF), and other application functions (AFs). In one example, server(s) 199 may comprise one or more NFs having extended functionality in accordance with the present discourse. For instance, server(s) 199 may include an NWDAF, which may obtain network event notifications, generate time series, apply a time series anomaly detection algorithm to the time series to identify time intervals containing anomalies, apply queries to a generative model comprising records associated with the time interval(s) to obtain interpretations of the time series anomaly detection results, and so forth.

In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. It should be noted that the example described above involves a 4G-to-5G PDN connection transfer (and 5G-to-4G reversion) that includes UE 106 transferring from cell site 124 to cell site 122 (and vice versa). However, in another example, UE 106 may establish a 4G session to a PDN via 4G/LTE components of cell site 123, and may be transferred to a 5G connection via 5G components of the same cell site 123 in response to one or more trigger conditions as described above. Thus, these and other modifications are all contemplated within the scope of the present disclosure.

As discussed above, an NF transaction failure time series of the present disclosure may comprise a sequence of values over a plurality of time intervals, where each value of the sequence of values indicates a percentage of events generated by an NF indicating a procedure/transaction failure within a respective time interval out of a total number of events generated by the respective NF within the time interval. For instance, in one example, time series may be characterized by a 15 minute granularity. In other words, the time interval may be 15 minutes. However, in other examples, a different time interval may be used, such as 5 minutes, 10 minutes, 30 minutes, etc. In one example, the percentage value may be a normalized metric ranging from 0 to 1. For instance, 0 means none of the events generated by an NF during a given time interval were failure events. On the other hand, 1 means all events generated by the NF during a given time interval were failure events. In various instances, an anomaly (e.g., a time interval having an anomalous residual value) may be a point anomaly, a contextual anomaly, and/or part of a collective anomaly.

In one example, the present disclosure may identify time intervals in which time series may exhibit anomalies according to a time series anomaly detection algorithm. To illustrate, in one example, the present disclosure may apply a univariate time series anomaly detection to identify, for a given time series, any time intervals that are anomalous. For instance, an anomalous time period may be identified when the value deviates significantly, e.g., by more than a threshold value or percentage from an overall mean during an evaluation time window (e.g., a 24 hour time period, a 48 hour time period, a week time period, or the like). In one example, a model may be generated for a time series that accounts for seasonality and trend, where the model may be used for forecasting/prediction of values for subsequent time intervals. Then when actual observed values are recorded for the subsequent time intervals, a difference between the predicted/forecast values and the respective observed values may be evaluated. Where the deviation from the predicted/forecast value and the observed value is significant, e.g., exceeds a threshold, the observed value (and/or the time interval) may be identified as an anomaly. In one example, the time series anomaly detection algorithm may include training a model based upon a sliding time window of the past values in the time series. For instance, in one example, the model generation may be in accordance with a statistical method. In another example, the model generation may be machine learning (ML)-based.

To illustrate, examples of the present disclosure may use one or more time series prediction/forecasting models, such as a moving average (MA) model, an autoregressive distributed lag (ADL) model, an autoregressive integrated moving average (ARIMA) model, a seasonal ARIMA (SARIMA) model, or the like. Similarly, other regression-based models may be trained and used for prediction/forecasting of the present disclosure, such as logistic regression, polynomial regression, ridge regression, lasso regression, etc. In one example, the present disclosure may employ a model that using multiple factors as predictors (e.g., covariates, or exogenous factors). For instance, a seasonal auto-regressive integrated moving average with exogenous factors (SARIMAX) model may be used. Alternatively, a vector auto-regression (VAR), or VAR moving average (VARMA) model may be used. Similarly, a vector auto-regression moving-average with exogenous factors/regressors (VARMAX) model may be applied.

Alternatively, or in addition, the present disclosure may utilize a trained ML-based forecasting/prediction model representing the time series, e.g., a machine learning model (MLM) comprising a trained machine learning algorithm. For instance, a machine learning algorithm (MLA), or machine learning model (MLM) trained via a MLA may comprise: a deep learning neural network, or deep neural network (DNN), a recurrent neural network (RNN), a long-short term memory (LSTM) neural network, a convolutional neural network (CNN), a graph attention network, a decision tree algorithms/models, such as gradient boosted decision tree (GBDT) (e.g., XGBoost, or the like), a support vector machine (SVM), and so forth.

In one example, the present disclosure may model a time series in accordance with non-supervised ML techniques. These include (but are not limited to) a time-series clustering algorithm (e.g., an MLM/MLA) such as k-means clustering or variants thereof (e.g., partitioning around medioids (PAM), k-medioid, etc.), density-based spatial clustering of applications with noise (DBSCAN), and so forth.

In one example, the time series anomaly detection algorithm may include extracting trend and seasonality component(s) from each time series to generate a residual time series. For instance, seasonality may capture fluctuation over 96 time intervals of 15 minutes, e.g., a day. Similarly, trend may capture more long-term changes, e.g., over a week. For example, where the "level", or mean of the time series changes over an extended time period, the time series may be described as exhibiting a trend. It should be noted that in other data sets in other technology areas, "seasonality" may look to fluctuations month to month, while trend may look to changes over years, for example. However, in the present application, seasonality may be across time intervals on a 12 hour basis, over a day, over a 48 hour time period, or the like, while trend may be across time intervals of 5 days, a week, 10 days, 2 weeks, or the like. In any case, the residual time series is what is left over after extracting trend and seasonality from the actual observed/recorded time series. For instance, the present disclosure may generate a residual value for each time interval (e.g., given the observed, normalized number of failed events in given time interval, that which is left over in view of a model that accounts for trend and seasonality). Accordingly, the present disclosure may then detect anomalies in accordance with the residual time series.

In one example, the present disclosure may further apply a multivariate time series anomaly detection algorithm to identify time intervals containing multiple anomalous NFs (e.g., time intervals in which multiple time series associated with multiple NFs exhibit anomalies in the respective values) in accordance with non-supervised ML techniques. For instance, this may include adjusting for correlations among NFs in their residual time series, e.g., by applying a Mahalanobis distance measure or the like (e.g., to identify outliers in multivariate time series by adjusting for correlations between univariate residual scores in the multivariate time series). To further illustrate, at least one such time interval may be detected in accordance with a correlation metric among a plurality of anomalies identified in a plurality of residual time series associated with a plurality of NFs.

In one example, by applying supervised ML, the multiple time series, or residual time series may comprise the inputs to train a multivariate forecasting/prediction model that may then be used to score and identify those time intervals which may be considered anomalous from a multivariate perspective in accordance with the multiple time series that may be found to have individually identified anomalous values in a same time interval. For instance, this stage may utilize a graph attention network, a variational autoencoder model, a clustering model, and so forth. As such, the result of time series anomaly detection in accordance with the present disclosure is an identification of one or more time intervals for one or more NFs (or one or more NF transaction failure event time series associated with the one or more NFs) exhibiting an anomaly.

In a next stage, the present disclosure may further obtain attribute information associated with the one or more NFs and/or NF transaction event data associated with the anomalous time intervals for use in subsequently obtaining generative interpretations of the time series anomaly detection results. For instance, for a detected anomalous NF in a time interval for an NF, the present disclosure may compute an entropy metric for settings/values of various attributes over failure events to identify attributes with low entropy (e.g., below a threshold, such as 0.3, or the like). Attributes with low entropy values represent dominant settings for NF failure events and hence define a NF failure pattern. In this regard, FIG. 2 illustrates an example table 200 comprising dominant attribute settings for a NF detected to be anomalous during a 15-minute time interval. For instance, as noted above, event notifications, including those indicating transaction failures, may include timestamps and may further record information about the NF and/or the procedure/transaction, such as the values/settings for various attributes, such as new radio cell identifier (NCI), international mobile subscriber identity (IMSI), access and mobility management identifier (AMFI), tracking area information (TAI), event description (event_desc), and so forth. In the example of FIG. 2, dominant attribute settings are presented in the table 200, e.g., those attributes with low entropy (e.g., below 0.3, below 0.25, etc.) and settings for those attributes with high occurrences in the event notifications of failure events for the NF in the time interval (e.g., exceeding a threshold, e.g., 0.8 (80%), 0.9 (90%), or the like). For instance, for the attribute "NCI" a dominant setting is 15591452724, which may indicate that a particular cell having this NCI is a root cause or is associated with a root cause of failure for the given NF (e.g., an AMF). For instance, the transaction/procedure type may be AMF_PDU SESSION ESTABLISHMENT, which may account for a proportion of total failure events for this AMF in the time interval of 0.982 (98.2%). In addition, the attribute value of 15591452724 for NCI is found in 99.2% of all failure event notifications/records for this AMF within the time interval. Similarly, the attribute value of 253-521-45 for AMFI is found in 99.2% of all failure vent notifications/records for this AMF within the time interval (and likewise for the attribute value of 310-

410-2132025 that is found in 99.2% of all failure vent notifications/records for this AMF within the time interval). It should be noted that these similarities may be expected where the NCI identifies a particular cell. In this case, all of the failure event notifications/records that include this NCI value should also include the same AMFI and TAI values (e.g., 253-521-45 and 310-410-2132025, respectively). In one example, attributes/attribute settings with entropy below a threshold and/or proportion of failed events with attributes/attribute settings above a threshold may be used as input data for generative output creation via a generative model. Thus, for instance, in the example of FIG. 2, the attributes and dominant settings contained in the table 200 may be those meeting the thresholds/criteria.

Figure 3:
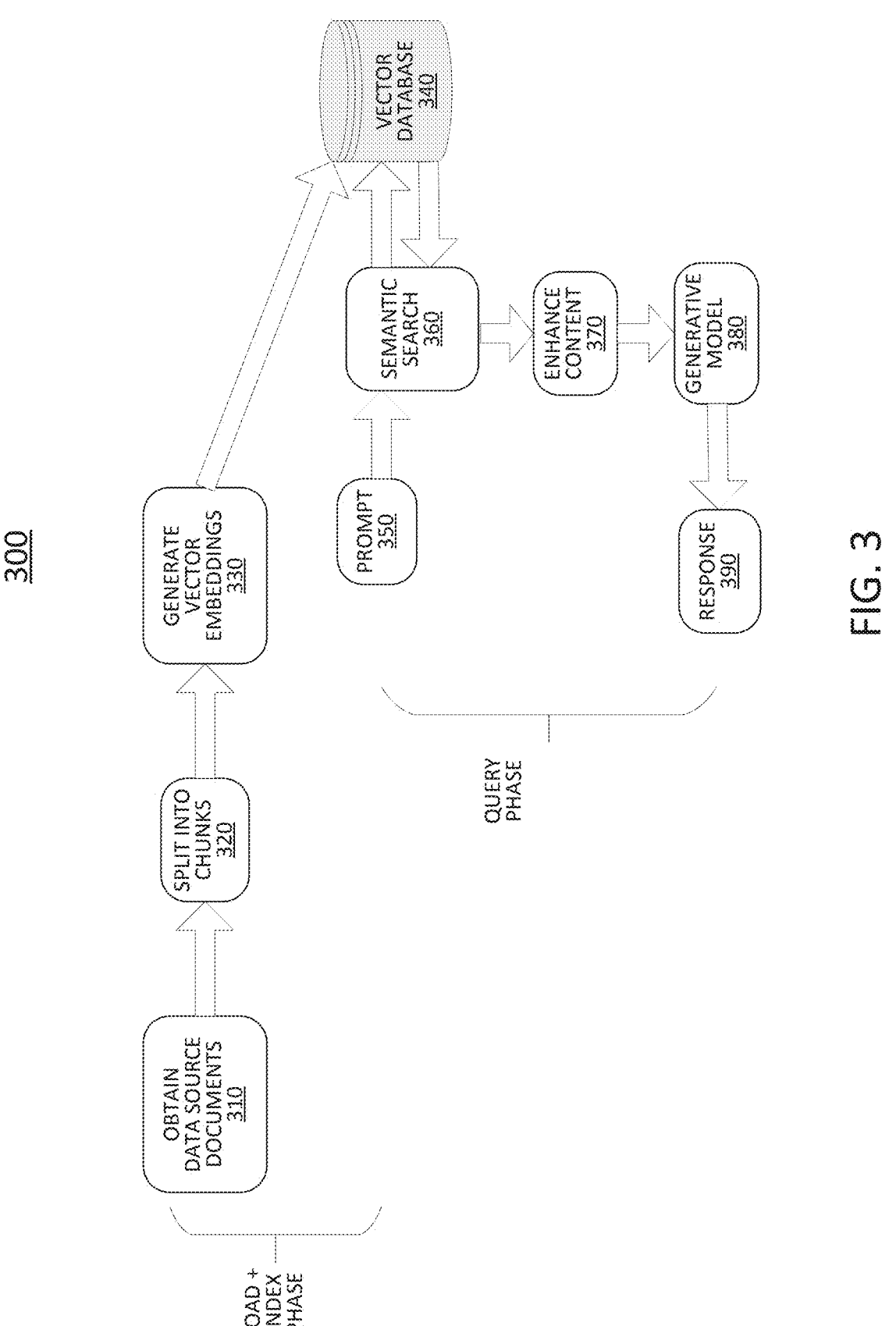
FIG. 3 illustrates an example process for retrieval augmented generation, in accordance with the present disclosure.

FIG. 3 illustrates an example process 300 for a retrieval augmented generation (RAG), in accordance with the present disclosure. To illustrate, at 310, a processing system may obtain data source documents, e.g., in electronic text format(s), such as technical whitepapers, instruction manuals, etc. The data source documents may be internal documents of an enterprise or another organization operating the processing system, or may be public source documents, purchased or licensed documents, or other documents that are authorized to be utilized by an operator of the processing system. In any case, at 320, the data source documents may be chunked, or segmented, e.g., split into chunks/segments of the same or various lengths. For instance, the chunking/segmenting may be according to any one of a number of chunking/segmenting algorithms, such as a sliding window segmentation, sentence-level splitting, sentence-level splitting with removal of stop words, and so forth. In one example, documents may be in a mixed media format, such as including text and images, which may also include captions, as well as news, magazine, and/or general webpage layouts, which may guide the chunking using visual cues or other aspects according to various algorithms. For instance, paragraphs may be visually distinguished from one another for readability, such as using extra space between paragraphs and around paragraphs, and so forth.

At 330, the processing system may generate vectors/vector embeddings of the chunked documents, such as using word2vec and/or doc2vec, a general text embedding (GTE) model, a E5 (EmbEddings from bidirEctional Encoder rEpresentations) embedding model (such as E5 v.2, etc.), a Bidirectional Attentive Autoencoder for Inducing Semantics (BAAI) embedding model, a BAAI general embedding (BGE) embedding model (e.g., v. 1.5, etc.), an Multi-Linguality, Multi-Functionality, and Multi-Granularity (M3) embedding model, a BGE-M3 embedding model, and so forth.

At 340, the processing system may add the vector embeddings to a vector database. For instance, the vector database may be internal to an enterprise or another organization operating the processing system, or may be a shared vector database among collaborating enterprises, etc.

At 350, the processing system may receive a prompt. For example, an operator or a user may provide the prompt.

At 360, the processing system may perform a search over the vector database based upon the prompt, e.g., a semantic search. For instance, the prompt may be similarly vectorized and the vectors/vector embeddings of the prompt may be compared to vectors in the vector database to find the closest matching vectors. In one example, the identified vectors may be joined with the prompt at 370 to create an enhanced prompt content comprising an input/input data set for a generative model (e.g., a large language model (LLM)) at

380. In one example, the generative model may be implemented by the processing system.

At 390, the processing system may therefore generate a response to the prompt via the LLM, and provide the response as an output of the process flow 300. It should be noted that FIG. 3 illustrates just one example of a retrieval augmented generation process, and that other, further, and different examples may be implemented in a different manner in accordance with the present disclosure. For instance, in one example, the prompt may identify specific documents to be used for augmentation/enhancement. As such, the search of the vector database may be specifically directed rather than using a semantic search. Alternatively, or in addition, the relevant data sources/documents may be provided as part of the query or accompanying the query. Similarly, the query may specify where relevant data source documents may be obtained for subsequent chunking, vectorization, and storage at 320-340. Thus, these and other modifications are all contemplated within the scope of the present disclosure.

FIG. 4 illustrates an example query 410, which may include a prompt 415 and records 418 for a plurality of attributes associated with one or more identified anomalies, and a corresponding response 420. Notably, the example prompt 415 may comprise a template that includes relevant background information and a natural language request, or query. For instance, the request/query may be: "Based on your best interpretation, can you please tell me which failing Network Function and NFProc Correlated Attribute Value is the root cause of the other failing Network Functions?" In the present example, the background information may include a description of an architecture of the communication network and a description of a structure of input data included in the query 410 (e.g., a structure of the records 418). In particular, the structure of the records 418 may include vectors of comma-separated values of: Bin Number (e.g., a label for the 15 minute time interval associated with the record), Timestamp (e.g., the actual date and time interval to which the record pertains), NFProc Name (e.g., the name of the network function procedure), NFProc Correlated Attribute Name (e.g., the name of the attribute, such as gNB, IMSI, Market, Region, tracking area identifier (TAI), etc.), NFProc Correlated Attribute Value (e.g., the value of the attribute having a low entropy and/or a high occurrence rate), and NFProc Correlated Attribute Value Share of Failed Events (e.g., the occurrence rate, such as a percentage/ratio on a scale of 0 to 1 of failure events having the attribute value).

The example response 420 may be generated via a generative model in response to the query 410. In particular, the prompt 415 requests an identification of a root case Network Function and NFProc Correlated Attribute Value. The response 420 addresses this request, providing a concise conclusion and additional rationale, e.g., details of why the conclusion was reached that SMF_NETWORK_INITIATED_PDU_SESSION_RELEASE with the NFProc Correlated Attribute Value of "Timed out waiting for the Update Sm Context Message" is the likely root cause of other failing network functions. In one example, the response 420 may be created via a generative model, e.g., an LLM. For instance, the generative model may comprise a generative pre-trained transformer (GPT) model, a Large Language Model Meta AI (LLaMA) model, a Language Model for Dialogue Applications (LaMDA) model, a Pathways Language Model (PaLM) model, a bidirectional transformer that is pre-trained for language understanding/natural language processing (NLP) tasks (e.g., a Bidirectional Encoder Representations from Transformers (BERT) model), and so forth.

In addition, in one example, the generative model may be implemented in accordance with a retrieval augmented generation (RAG) process, such as illustrated in FIG. 3 and described above. As such, the generative model may provide the response 420 having a more particularized interpretation that is specific to the 5G mobility domain and/or a particular cellular network associated with the processing system and/or the user thereof using additional documentation that is relevant to the contents of the prompt 415.

FIG. 5 illustrates an additional query 510, which may include a prompt 515 and input records 518, and a corresponding response 520 of a generative model in accordance with the present disclosure. In particular, in the example of FIG. 5, the prompt 515 may comprise a template for requesting an interpretation of network function failure pattern over time, e.g., for a particular network function. It should be noted that in the examples of FIGS. 4 and 5, the prompts 415 and 515 may comprise templates in the sense that these prompts may be selected and reused for various requests over time, where the prompts 415 and 515 are standardized, but where the input records 418 and 518 may change from query to query. The prompts 415 and 515 may be respectively particularized to the two intended results/responses, e.g., root cause analysis/identification and interpretation of NF failure pattern over time. Continuing with the example of FIG. 5, the background information in the prompt 515 may include a description of an architecture of the communication network and a description of a structure of input data included in the query 510 (e.g., a structure of the records 518). For instance, the structure of the records 518 may be the same as for the records 418 of FIG. 4, e.g., a vectors of comma-separated values. However, in contrast to the set of records 418 in FIG. 4, the records 518 of FIG. 5 may relate to a single network function, e.g., an SMF.

Similar to the above, the response 520 may be created via a generative model, e.g., an LLM. In addition, in one example, the generative model may be implemented in accordance with a retrieval augmented generation (RAG) process, such as illustrated in FIG. 3 and described above. As such, the generative model may provide the response 520 having a more particularized interpretation that is specific to the 5G mobility domain and/or a particular cellular network associated with the processing system and/or the user thereof using additional documentation that is relevant to the contents of the prompt 515. For instance, in this case, based upon the query 410, e.g., including the particular prompt 415 and the set of records 418, the generative model may generate the particular response 520 as illustrated in FIG. 5.

It should be noted that FIGS. 4 and 5 are illustrative in nature and are not intended to imply that the same specific responses 420 and 520 may inevitably be generated. For instance, the prompts 415 and 515 may have a different wording, while conveying essentially the same information. However, the generative model(s) may process these prompts differently and may cause changes in the output responses. For instance, the root cause may be the same, but the wording of the response may be different from that of the response 420 in FIG. 4. Similarly, different responses may be obtained depending on whether or not a RAG process is implemented. Likewise, different responses may be obtained if different vectors are extracted via RAG and applied as supplemental input content to the generative model. In addition, an actual response generated from an LLM-based generative model in response to a prompt may be different depending upon the given data set, the configuration of the generative model, and so forth.

FIG. 6 illustrates a flowchart of an example method 600 for obtaining an interpretation of an anomaly detection result of a time series anomaly detection algorithm for time series associated with network function procedure failures via a generative model, in accordance with the present disclosure. In one example, steps, functions and/or operations of the method 600 may be performed by a device, or devices, as illustrated in FIG. 1, e.g., server(s) 199, or any one or more components thereof, such as a processing system, or collectively via a plurality devices in FIG. 1, such as one or more of server(s) 199 in conjunction with SON/SDN controller 190, AMF 135, NSSF 136, SMF 137, UPF 139, and so forth. In one example, the steps, functions, or operations of method 600 may be performed by a computing device or system 700, and/or a processing system 702 as described in connection with FIG. 7 below. For instance, the computing device 700 may represent at least a portion of server(s) 199 in accordance with the present disclosure. For illustrative purposes, the method 600 is described in greater detail below in connection with an example performed by a processing system, such as processing system 702. The method 600 begins in step 605 and proceed to step 610.

At step 610, the processing system obtains a plurality of time series associated with a plurality of network functions of a communication network, where each of the plurality of time series comprises a sequence of values over a plurality of time intervals, and where each value of the sequence of values indicates a percentage of events generated by a respective network function (e.g., from among the plurality of network functions) indicating a procedure failure within a respective time interval of the plurality of time intervals out of a total number of events generated by the respective network function within the respective time interval. For instance, in one example, step 610 may include collecting sets/streams of network function (NF) transaction events/ event records for a plurality of NFs. As discussed above, the plurality of network function transaction events may be associated with a plurality of cellular network function instances (e.g., virtual and/or physical NFs) of the communication network. For instance, the NF transaction events may comprise NF failure events/failure event messages. In addition, in such an example, step 610 may further include generating the plurality of time series from the sets/streams of NF transaction events/event records. In one example, step 610 may alternatively or additionally include retrieving the time series from a data repository of the communication network, e.g., a database system comprising one or more servers.

At step 620, the processing system identifies, via a time series anomaly detection algorithm implemented by the processing system, an anomaly detection result comprising at least one time interval of the plurality of time intervals in which at least one time series of the plurality of time series exhibits at least one anomaly. In one example, the time series anomaly detection algorithm may comprise a multivariate time series anomaly detection algorithm. For instance, the processing system may use one or more time series prediction/forecasting models, such as: a moving average (MA) model, an autoregressive distributed lag (ADL) model, an autoregressive integrated moving average (ARIMA) model, a seasonal ARIMA (SARIMA) model, or the like, other regression-based models, such as logistic regression, polynomial regression, ridge regression, lasso regression, etc., a seasonal auto-regressive integrated moving average with exogenous factors (SARIMAX) model, a vector auto-regression (VAR) or VAR moving average (VARMA) model, a vector auto-regression moving-average with exogenous factors/regressors (VARMAX) model, and so forth. In one example, step 620 may include generating a model for one or more time series in accordance with a time-series clustering algorithm (e.g., an MLM/MLA) such as k-means clustering or variants thereof (e.g., partitioning around medioids (PAM), k-medioid, etc.), density-based spatial clustering of applications with noise (DBSCAN), and so forth.

In one example, for each of the plurality of time series, the time series anomaly detection algorithm may include generating a residual time series by extracting trend and seasonality components. In one example, the at least one time interval may be detected via the time series anomaly detection algorithm in accordance with the residual time series for the at least one time series of the plurality of time series. In one example, the at least one time interval may be detected in accordance with a distance metric, such as Mahalanobis distance, among a plurality of anomalies identified in a plurality of residual time series associated with a plurality of network functions. To further illustrate, in one example, a representation may be generated for a time series that accounts for seasonality and trend, where the observed deviation from the representation may be used for detecting anomalous time periods in the time series. Then when actual observed values are recorded for the subsequent time intervals, a difference between the predicted/forecast values and the respective observed values may be evaluated. Where the deviation from the predicted/forecast value and the observed value is significant, e.g., exceeds a threshold, the observed value (and/or the time interval) may be identified as an anomaly.

At step 630, the processing system applies a query to a generative model requesting an interpretation of the anomaly detection result, where an output comprising the interpretation is generated via the generative model in response to the query. For instance, in one example, the generative model may be implemented by the processing system (e.g., where instructions, code, etc., may be loaded into memory and executed by at least one processor of the processing system). In one example, the generative model, e.g., an LLM, may comprise a generative pre-trained transformer (GPT) model, a Large Language Model Meta AI (LLaMA) model, a Language Model for Dialogue Applications (LaMDA) model, a Pathways Language Model (PaLM) model, a bidirectional transformer that is pre-trained for language understanding/natural language processing (NLP) tasks (e.g., a Bidirectional Encoder Representations from Transformers (BERT) model), and so forth.

In one example, the query may include a prompt, such as prompt 415 of FIG. 4 or prompt 515 of FIG. 5, or the like. For instance, the prompt may be from a prompt template defined by a system operator. In this regard, in one example, step 630 may include obtaining a prompt selection from a user, e.g., from among a plurality of available prompts/ prompt templates. In another example, the query (e.g., including prompt retrieval/activation) may be initiated automatically by the processing system, e.g., on an ongoing basis (such as periodically, when an anomaly is detected/in response to an anomaly, or otherwise) without user input. As discussed in the examples above, the prompt may include a description of an architecture of the communication network. Alternatively, or in addition, the prompt may include a description of a structure of input data included in the query.

As also described above, the query may include a plurality of records for a plurality of attributes associated with the at least one anomaly (and/or associated with procedure failures within the at least one time interval). For instance, at least one record of the plurality of records may include: a time stamp, an identification of a network function associated with the at least one time series having exhibiting the at least one anomaly, an identification of a procedure initiated by the network function, an identification of an attribute type, and an attribute value for the attribute type, where the at least one attribute value is associated with at least one of: the network function or the procedure. In one example, the attribute value may be determined to be correlated with the at least one anomaly in which the attribute value of shared events (e.g., the proportion of failed events demonstrating the attribute value) exceeds a threshold. For instance, the at least one record may further include a correlation metric (such as NFProc Correlated Attribute Value Share of Failed Events in the examples of FIGS. 4 and 5). In one example, step 610 may include selecting the records for inclusion in the input to the generative model when the respective attribute values having a correlation metric with the at least one anomaly (e.g., associated with failure events in the at least one time interval) exceed the threshold.

In one example, step 630 may include selecting one or more vectors from a vector database that are relevant to the prompt. For instance, the one or more vectors comprise vectorized text from one or more data sources. For example, the processing system may perform a sematic search over a vector database based on the prompt content, e.g., as described in connection with 360 of FIG. 3. In addition, in such an example, step 630 may further include applying the one or more vectors as supplemental prompt content to the generative model (e.g., the query may further include the one or more vectors as supplemental prompt content). In one example, the selecting of the one or more vectors and the applying of the one or more vectors as the supplemental prompt content to the generative model may comprise a retrieval augmented generation (RAG) process.

In one example, the query may request an identification of a root cause network function from among network functions of the plurality of network functions associated with the multiple time series of the plurality of time series exhibiting anomalies in the at least one time interval. For instance, in such an example, the plurality of records may include records associated with multiple time series of the plurality of time series exhibiting anomalies in the at least one time interval. In addition, in such an example, the output comprising the interpretation of the anomaly detection result may identify the root cause network function, such as the example response 420 of FIG. 4. For instance, the root cause network function could be the network function associated with the at least one time series having the at least one anomaly, or another, e.g., one with a attribute having the highest correlation metric, or having a relatively high correlation metric and/or multiple correlated attributes and also being indicative of being upstream from other failed NFs in the same time interval(s). Alternatively, or in addition, the query may request an identification of a root cause procedure from among procedure failures of network functions of the plurality of network functions associated with the multiple time series of the plurality of time series exhibiting anomalies in the at least one time interval. In such case, the output comprising the interpretation of the anomaly detection result may alternatively or additionally identify the root cause procedure, such as the response 420 of FIG. 4.

In another example, the query may request a description of a procedure failure pattern change over time for at least one network function. In such an example, each of the plurality of records may be associated with the network function (i.e., the same number function) associated with the at least one time series exhibiting the at least one anomaly. For instance, the records may be for procedures initiated by the same NF, but over an extended time range that includes multiple anomalous time intervals. In addition, in such an example, the output indicative of the at least one anomaly may include the description of the procedure failure pattern change, such as the response 520 of FIG. 5. Still other examples may include prompts/prompt templates requesting interpretations of other types of NF event time series anomalies, such as NF response latency exceeding a threshold, dropped packet/octet rate exceeding a threshold, an NF throughput falling below a threshold, and so forth.

At step 640, the processing system presents, to at least one endpoint device, the output comprising the interpretation of the anomaly detection result. For instance, a user, via an endpoint device, may select the prompt/prompt template (e.g., root cause analysis, changing NF failure pattern over time, etc.) may select a network function to which a query may be directed, may select a time range over which a query is to pertain, and so forth. The selection may be made via a graphical user interface for obtaining generative interpretations of NF transaction/procedure failure events, via voice command, via keyboard input, etc. In addition, the output/response may be presented via the endpoint device, e.g., as text on a display screen, as audio output, etc. In one example, step 640 may also include generating one or more visualizations in accordance with the output of the generative model. For instance, a text output may be further input to another generative model to generate one or more visualizations representative of the output, such as illustrating a root cause network function on a topological map/view of the communication network, illustrating other affected network functions, such as via highlighting, overlaying arrows, etc. Thus, these and other modifications are all contemplated within the scope of the present disclosure.

At optional step 650, the processing system may reconfigure at least one aspect of the communication network in response to the output of the generative model. For instance, where a root cause may be identified by the output, optional step 650 may include re-setting the root cause network function, re-routing network traffic away from or around the network function, and so forth. To further illustrate, in one example, the processing system may comprise or include an SDN controller, and SON orchestrator, or the like. In another example, optional step 650 may include transmitting the output, or selected information extracted from the output to an SDN controller or SON orchestrator. In one example, optional step 650 may include transmitting instructions to one or more network components, e.g., physical or virtual network functions, NFVI/host device hosting virtual network functions, or the like, e.g., to instantiate or de-instantiate a network function, to change settings or otherwise reconfigure a network function, and so forth.

Following step 640 or optional 650, the method 600 may proceed to step 695 where the method ends.

It should be noted that the method 600 may be expanded to include additional steps or may be modified to include additional operations with respect to the steps outlined above, to remove operations, to perform operations in a different order, and so forth. In one example, one or more steps of the method 600 may be repeated, e.g., on an ongoing basis. For instance, in one example, the method 600 may include repeating steps 610-650 to identify trends in NF failure events over time for an NF, to identify a root case NF that may be affecting other NFs, etc., and to implement one or more remedial actions in the communication network at step 650 accordingly. In one example, the method 600 may be expanded to include obtaining a new prompt, e.g., from a user. In such an example, the prompt may be subsequently saved as a prompt template, e.g., for later reuse by the same or another user. In one example, the method 600 may be expanded or modified to include steps, functions, and/or operations, or other features described above in connection with the example(s) of FIGS. 1-5, or as described elsewhere herein. Thus, these and other modifications are all contemplated within the scope of the present disclosure.

In addition, although not specifically specified, one or more steps, functions, or operations of the method 600 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 6 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 7 depicts a high-level block diagram of a computing device or processing system specifically programmed to perform the functions described herein. As depicted in FIG. 7, the processing system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for obtaining an interpretation of an anomaly detection result of a time series anomaly detection algorithm for time series associated with network function procedure failures via a generative model, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 706 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method(s) as discussed above is/are implemented in a distributed or parallel manner for a particular illustrative example, i.e., the steps of the above method(s) is/are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 702 can also be configured or programmed to cause other devices to perform one or more operations as discussed above. In other words, the hardware processor 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method(s). In one example, instructions and data for the present module or process 705 for obtaining an interpretation of an anomaly detection result of a time series anomaly detection algorithm for time series associated with network function procedure failures via a generative model (e.g., a software program comprising computer-executable instructions) can be loaded into memory 704 and executed by hardware processor element 702 to implement the steps, functions, or operations as discussed above in connection with the illustrative method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for obtaining an interpretation of an anomaly detection result of a time series anomaly detection algorithm for time series associated with network function procedure failures via a generative model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    obtaining, by a processing system including at least one processor, a plurality of time series associated with a plurality of network functions of a communication network, wherein each of the plurality of time series comprises a sequence of values over a plurality of time intervals, wherein each value of the sequence of values indicates a percentage of events generated by a respective network function of the plurality of network functions indicating a procedure failure within a respective time interval of the plurality of time intervals out of a total number of events generated by the respective network function within the respective time interval;

identifying, by the processing system via a time series anomaly detection algorithm implemented by the processing system, an anomaly detection result comprising at least one time interval of the plurality of time intervals in which at least one time series of the plurality of time series exhibits at least one anomaly;

applying, by the processing system, a query to a generative model requesting an interpretation of the anomaly detection result, wherein an output comprising the interpretation is generated via the generative model in response to the query; and presenting, by the processing system to at least one endpoint device, the output comprising the interpretation of the anomaly detection result.

2. The method of claim 1, wherein the time series anomaly detection algorithm comprises a multivariate time series anomaly detection algorithm.

3. The method of claim 2, wherein for each of the plurality of time series, the time series anomaly detection algorithm includes generating a residual time series by extracting trend and seasonality components.

4. The method of claim 3, wherein the at least one time interval is detected via the time series anomaly detection algorithm in accordance with the residual time series for the at least one time series of the plurality of time series.

5. The method of claim 3, wherein the at least one time interval is detected in accordance with a correlation metric among a plurality of anomalies identified in a plurality of residual time series associated with the plurality of network functions.

6. The method of claim 1, wherein the generative model is implemented by the processing system.

7. The method of claim 1, wherein the query includes a prompt.

8. The method of claim 7, wherein the prompt includes a description of an architecture of the communication network.

9. The method of claim 7, wherein the prompt includes a description of a structure of input data included in the query.

10. The method of claim 7, wherein the applying further comprises:

selecting one or more vectors from a vector database that are relevant to the prompt, wherein the one or more vectors comprise vectorized text from one or more data sources; and applying the one or more vectors as supplemental prompt content to the generative model.

11. The method of claim 10, wherein the selecting of the one or more vectors and the applying of the one or more vectors as the supplemental prompt content to the generative model comprise a retrieval augmented generation process.

12. The method of claim 1, wherein the query includes a plurality of records for a plurality of attributes associated with the at least one anomaly, wherein at least one record of the plurality of records includes: a time stamp, an identification of a network function associated with the at least one time series exhibiting the at least one anomaly, an identification of a procedure initiated by the network function, an identification of an attribute type, and an attribute value for the attribute type, wherein the at least one attribute value is associated with at least one of: the network function or the procedure.

13. The method of claim 12, wherein the attribute value is determined to be correlated with the at least one anomaly when a correlation metric exceeds a threshold, wherein the at least one record further includes the correlation metric.

14. The method of claim 12, wherein the plurality of records includes records associated with multiple time series of the plurality of time series exhibiting anomalies in the at least one time interval.

15. The method of claim 14, wherein the query requests an identification of a root cause network function from the plurality of network functions associated with the multiple time series of the plurality of time series exhibiting anomalies in the at least one time interval, wherein the output comprising the interpretation of the anomaly detection result identifies the root cause network function.

16. The method of claim 12, wherein the query requests an identification of a root cause procedure from among procedure failures of network functions of the plurality of network functions associated with the multiple time series of the plurality of time series exhibiting anomalies in the at least one time interval, wherein the output comprising the interpretation of the anomaly detection result identifies the root cause procedure.

17. The method of claim 12, wherein each of the plurality of records is associated with the network function associated with the at least one time series exhibiting the at least one anomaly.

18. The method of claim 17, wherein the query requests a description of a procedure failure pattern change over time for at least one network function, wherein the output indicative of the at least one anomaly includes the description of the procedure failure pattern change.

19. A non-transitory computer-readable medium storing instructions which, when executed by a processing system including at least one processor, cause the processing system to perform operations, the operations comprising:

obtaining a plurality of time series associated with a plurality of network functions of a communication network, wherein each of the plurality of time series comprises a sequence of values over a plurality of time intervals, wherein each value of the sequence of values indicates a percentage of events generated by a respective network function of the plurality of network functions indicating a procedure failure within a respective time interval of the plurality of time intervals out of a total number of events generated by the respective network function within the respective time interval;

identifying, via a time series anomaly detection algorithm implemented by the processing system, an anomaly detection result comprising at least one time interval of the plurality of time intervals in which at least one time series of the plurality of time series exhibits at least one anomaly;

applying a query to a generative model requesting an interpretation of the anomaly detection result, wherein an output comprising the interpretation is generated via the generative model in response to the query; and presenting, to at least one endpoint device, the output comprising the interpretation of the anomaly detection result.

20. An apparatus comprising:

a processing system including at least one processor; and a computer-readable medium storing instructions which, when executed by the processing system, cause the processing system to perform operations, the operations comprising:

obtaining a plurality of time series associated with a plurality of network functions of a communication network, wherein each of the plurality of time series comprises a sequence of values over a plurality of time intervals, wherein each value of the sequence of values indicates a percentage of events generated by a respective network function of the plurality of network functions indicating a procedure failure within a respective time interval of the plurality of time intervals out of a total number of events generated by the respective network function within the respective time interval;

identifying, via a time series anomaly detection algorithm implemented by the processing system, an anomaly detection result comprising at least one time interval of the plurality of time intervals in which at least one time series of the plurality of time series exhibits at least one anomaly;

applying a query to a generative model requesting an interpretation of the anomaly detection result, wherein an output comprising the interpretation is generated via the generative model in response to the query; and presenting, to at least one endpoint device, the output comprising the interpretation of the anomaly detection result.

* * * * *